United States Patent
Hölzel et al.

(10) Patent No.: US 10,106,021 B2
(45) Date of Patent: Oct. 23, 2018

(54) ARRANGEMENT COMPRISING A COVER FOR A VEHICLE ROOF

(71) Applicant: Webasto SE, Stockdorf (DE)

(72) Inventors: Dominik Hölzel, Olching (DE); Thomas Ripa, Herrsching (DE); Christian Lipovsky, München (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/547,734

(22) PCT Filed: Feb. 4, 2016

(86) PCT No.: PCT/EP2016/052405
§ 371 (c)(1),
(2) Date: Jul. 31, 2017

(87) PCT Pub. No.: WO2016/124700
PCT Pub. Date: Aug. 11, 2016

(65) Prior Publication Data
US 2018/0022194 A1    Jan. 25, 2018

(30) Foreign Application Priority Data
Feb. 6, 2015   (DE) ........................ 10 2015 101 747

(51) Int. Cl.
*B60J 7/057*        (2006.01)
*B60J 7/02*         (2006.01)
(Continued)

(52) U.S. Cl.
CPC ............... *B60J 7/057* (2013.01); *B60J 7/022* (2013.01); *B60J 7/043* (2013.01); *B60J 7/1856* (2013.01); *B60J 7/047* (2013.01)

(58) Field of Classification Search
CPC . B60J 7/047; B60J 7/057; B60J 7/0435; B60J 7/185; B60J 7/1856
(Continued)

(56) References Cited

U.S. PATENT DOCUMENTS

| 2004/0068839 A1 | 4/2004 | Hock et al. |
| 2014/0054934 A1 | 2/2014 | Vogel et al. |

(Continued)

FOREIGN PATENT DOCUMENTS

| DE | 102011015833 A1 | 10/2012 |
| DE | 102012016504 A1 | 2/2014 |

(Continued)

OTHER PUBLICATIONS

International Search Report for PCT/EP2016/052405 dated May 11, 2016; English translation submitted herewith (6 Pages).

*Primary Examiner* — Dennis H Pedder
(74) *Attorney, Agent, or Firm* — Fitch, Even, Tabin & Flannery, LLP

(57) ABSTRACT

Vehicle roof arrangement can have displaceable sliding member, activation element having a mechanical coupling element, locationally fixed construction element in relation to the guide rail and has a coupling element pocket, and an elastic element mounted to be locationally fixed in relation to the guide rail. In a first state the elastic element protrudes into the pocket. In a second state the elastic element is guided out of the pocket. In a first movement section of the sliding member the elastic element by the sliding member is transferable from the first state to the second state. In an adjacent second movement section an introduction of the coupling element into the pocket is controllable, and the activation element is blocked in the longitudinal direction of (Continued)

the vehicle. In an adjacent third movement section the elastic element is again transferable to the first state, and the coupling element is blocked.

16 Claims, 9 Drawing Sheets

(51) Int. Cl.
*B60J 7/043* (2006.01)
*B60J 7/185* (2006.01)
*B60J 7/047* (2006.01)

(58) Field of Classification Search
USPC .......... 296/216.02–216.05, 220.01, 223, 224
See application file for complete search history.

(56) References Cited

U.S. PATENT DOCUMENTS

| | | |
|---|---|---|
| 2015/0375606 A1 | 12/2015 | Ide |
| 2017/0113523 A1 | 4/2017 | Holzel |
| 2017/0151862 A1 | 6/2017 | Holzel |

FOREIGN PATENT DOCUMENTS

| | | |
|---|---|---|
| DE | 102014110234 A1 | 11/2015 |
| DE | 102014110626 A1 | 11/2015 |
| WO | 2014/123047 A1 | 8/2014 |

ARRANGEMENT COMPRISING A COVER FOR A VEHICLE ROOF

CROSS-REFERENCE TO RELATED APPLICATIONS

This application is a U.S. national phase application filed under 35 U.S.C. § 371 of International Application No. PCT/EP2016/052405, filed Feb. 4, 2016, designating the United States, which claims priority from German Patent Application No. 10 2015 101747.4, filed Feb. 6, 2015, which are hereby incorporated herein by reference in their entirety for all purposes.

FIELD

The invention relates to an arrangement comprising a cover for a vehicle roof.

BACKGROUND

Arrangements comprising a cover for a vehicle roof are known in many forms in the prior art. The cover in a closed position closes a roof opening of the vehicle roof. In the case of an opening procedure for releasing the roof opening, a (drive) sliding member is driven toward the rear in the longitudinal direction of the vehicle. The cover herein, starting from a closed position, is typically displaced toward the rear to an opened position. Deployment means for establishing the releasing or closing, respectively, of the roof opening by means of the cover are provided in lateral regions of the cover.

SUMMARY

An object on which the invention is based is to describe an arrangement comprising a cover for a vehicle roof which enables a reliable and precise release or closure, respectively, of a roof opening by means of the cover.

According to the invention, an arrangement comprising a cover for a vehicle roof is disclosed. The arrangement has a sliding member which is displaceable in a guide rail in the longitudinal direction of the vehicle by means of a drive. The arrangement furthermore has an activation element having a mechanical coupling element. Moreover, the arrangement has a construction element that is locationally fixed in relation to the guide rail, a pocket which in the shaping thereof is adapted to the mechanical coupling element being configured in said construction element. Furthermore, an elastic element that is mounted so as to be locationally fixed in relation to the guide rail is provided.

In a first state, the elastic element by way of a locking region protrudes into the pocket. In a second state, the locking region of the elastic element is guided out of the pocket. Starting from a closed position of the cover, when the sliding member is being displaced in the longitudinal direction of the vehicle, in a first movement section of the sliding member the elastic element by means of the sliding member is transferable from the first state to the second state. In an adjacent second movement section of the sliding member an introduction of the mechanical coupling element into the pocket is controllable such that a displacement of the activation element is blocked in the longitudinal direction of the vehicle. In an adjacent third movement section of the sliding member, the elastic element is transferable from the second state to the first state, and a movement of the coupling element out of the pocket is blocked in this instance.

The arrangement is an arrangement for a sliding roof, a spoiler roof, or an externally guided sliding roof, for example. The cover by means of the arrangement is typically displaced toward the rear in the longitudinal direction of the vehicle such that a roof opening of the vehicle roof is released.

The location indications or directional indications used, such as "rear" or "front", refer to the longitudinal direction of the vehicle. The longitudinal direction of the vehicle may also be referred to as the horizontal direction or X direction of the mathematical coordinate system. Deploying or raising of the cover would be performed substantially in a vertical direction or Z direction of the mathematical coordinate system. The rear region of the cover is intended, for example, to be understood to be the region which, starting from a center of the cover, faces a rear of the vehicle.

The activation element is a mechanical transmission element, for example, by means of which forces or movements are transmitted to another element of the arrangement. For example, the activation element contributes indirectly or directly toward a movement of the cover, such as a deployment or a raising of the cover. The activation element is configured as a lever, a control arm, or as a rod, for example. The activation element is disposed so as to be displaceable along the longitudinal direction of the vehicle, for example. The activation element herein can be activated by the sliding member. The activation element and the coupling element can be rigidly interconnected. The coupling element and the deployment rod are made so as to be integral, for example.

The construction element is a separate element of the arrangement that is locationally fixed in relation to the guide rail. Alternatively, the construction element is part of the guide rail.

The arrangement provides that the elastic element is activatable by means of the sliding member. The elastic element herein by means of the sliding member is transferable from the first state to the second state and/or vice versa.

Starting from the closed position of the cover, when the sliding member is being displaced, the elastic element in a first movement section is initially guided in a controlled manner to the second state in which the pocket is released for the coupling element to be introduced. In the second movement section of the sliding member, the coupling element is guided in a controlled manner into the pocket such that a movement of the activation element is blocked at least along the longitudinal direction of the vehicle. For example, the sliding member controls the activation element in such a manner that the coupling element is guided into the pocket. In the third movement section the elastic element in turn is transferred to the first state, wherein the locking portion protrudes into the pocket and blocks a movement of the coupling element out of the pocket. For blocking, the locking portion of the elastic element interacts mechanically with the coupling element. The movement of the coupling element in the direction of the pocket is substantially perpendicular to a movement along the longitudinal direction of the vehicle. For example, the movement of the coupling element in the direction of the pocket is performed in the Y direction.

The arrangement enables reliable blocking of the activation element. The blocking of the coupling element in the pocket by means of the elastic element contributes toward reliably releasing or closing the roof opening, respectively, by means of the cover. In particular, it is prevented by means of the elastic element in the first state that the mechanical coupling element can be guided out of the pocket. This is particularly advantageous for example when the cover is to be securely held in a specific position. For example, if the cover is to be held in that position in which the roof opening is at least partially released, it is ensured on account thereof that the activation element is locked in its position. A high degree of securing the activation element in terms of the position is thus established. A further advantage is derived in that any abuse of the arrangement or of the kinematics of the latter, respectively, is largely avoided. Any abusive removal of the mechanical coupling element from the pocket, for example with the aid of a pointed object, is prevented or significantly impeded. Unintentional releasing of the coupling element from the pocket, for example when cleaning or lubricating the arrangement and the kinematics thereof, is also prevented. Guiding the coupling element out of the pocket in an involuntary or abusive manner could have serious consequences, including personal injury.

The introduction of the coupling element into the pocket is performed in the manner of a form-fit. This guarantees that a movement of the activation element or of the coupling element, respectively, is blocked in a plane which runs so as to be normal to the introduction direction of the coupling element into the pocket. This plane is the X-Z plane of the arrangement, for example.

In the activation by means of the sliding member, and when being changed between the two states, the elastic element is moved in substantially one plane. This plane coincides with the afore-described plane that runs so as to be normal to the introduction direction, for example. The elastic element, in order to be transferred to the second state, is at least partially raised by the sliding member and lowered, in order to be transferred to the first state, for example.

According to one design embodiment, the elastic element in the first state protrudes into the pocket by way of a first groove which is configured in the construction element. By means of the groove that is provided in the construction element it is possible for the locking region of the elastic element to extend into the pocket. It is thus guaranteed that the locking region, in the case of the coupling element having been introduced into the pocket, can interact with the coupling element in order for the latter to be blocked within the pocket.

According to one further design embodiment, the elastic element is guided in the first groove. On account thereof, the elastic element is reliably guided at least on two sides and is movable in one plane by means of the sliding member. The guidance serves for ensuring that the elastic element can be reliably guided from the first state to the second state or vice versa, respectively.

According to one further design embodiment, a second groove is configured in the coupling element, the elastic element in the first state at least partially engaging in said second groove so as to be block the coupling element when the coupling element is located in the pocket. The locking region is in particular introduced into the second groove. On account thereof, this contributes toward reliable blocking of the coupling element in the pocket. For example, the first groove is aligned with the second groove when the coupling element has been introduced into the pocket. Alternatively, the second groove is configured as a notch, for example as a vertical notch.

According to one further design embodiment, the second groove of the coupling element is at least partially configured so as to be funnel-shaped. On account thereof, it is ensured that the locking region in the transfer of the elastic element from the second state to the first state is reliably introduced into the second groove of the coupling element. Canting or catching of the locking region is prevented on account thereof, for example. Furthermore, a smooth introduction of the locking region into the second groove, in particular without any disturbing noises, is enabled on account thereof.

According to one further design embodiment, one end of the elastic element is mounted so as to be locationally fixed, and the locking region of the elastic element is movable by means of the sliding member. On account of the locationally fixed mounting, the elastic element by way of the one end is mounted in a fixed position. On account thereof, the elastic element by means of the sliding member is movable in such a manner that the locking region is movable, counter to a spring force, about the one end of the elastic element.

According to one further design embodiment, the elastic element in the first state is pretensioned and impacts on a detent element. It is ensured by means of the detent element that the elastic element in the first state assumes a predefined position and is held in this position.

According to one further design embodiment, the elastic element has a contact region which when the sliding member is being displaced contacts the sliding member in order for the elastic element to be transferred from the first state to the second state and/or when being transferred from the second state to the first state. In order for the elastic element to be activated, the sliding member when being displaced along the longitudinal direction of the vehicle contacts the elastic element in the contact region. The contact region is not necessarily an individual point of the elastic element but rather a longitudinal portion of the elastic element along the guide rail. For example, the sliding member contacts the contact region by means of one or a plurality of slides of the sliding member that are guided in the guide rail. If the elastic element is in the first state, it is not a mandatory precondition for the sliding member to be in contact with the contact region of the elastic element.

According to one further design embodiment, the contact region is configured as a gate-type guide. On account thereof, smooth guiding of the movement in the transfer of the elastic element from the first state to the second state and vice versa is possible. Furthermore, a design embodiment with low wear is guaranteed on account thereof. Moreover, switching noises in the transfer of the elastic element from the one to the other of the two states are reduced or avoided.

According to one further design embodiment, the contact region has a first part-portion in which a spacing of an external side of the elastic element that faces a base of the guide rail from the base decreases toward the rear in the longitudinal direction of the vehicle. On account thereof, soft raising or lowering, respectively, of the elastic element when being transferred from the first to the second state or vice versa is enabled, for example. This depends on whether the sliding member is moved toward the rear or toward the front in the longitudinal direction of the vehicle.

According to one further design embodiment, the contact region has a second part-portion in which a spacing of an external side of the elastic element that faces a base of the guide rail from the base increases toward the rear in the longitudinal direction of the vehicle. The second part-portion is adjacent to the first part-portion, for example. On account thereof it is enabled that, when the sliding member is being displaced toward the rear along the direction of the vehicle, the elastic element is initially raised and subsequently lowered again. On account thereof, the elastic element can be transferred from the first state to the other state.

According to one further design embodiment, the elastic element by means of the sliding member is movable in a plane which is defined by the longitudinal direction of the vehicle and a vertical direction that is perpendicular thereto. The vertical direction herein corresponds to the Z direction of the mathematical coordinate system. Only a small installation space in a vehicle transverse direction is required on account thereof. Furthermore, the elastic element can be dimensioned so as to be very small.

According to one further design embodiment, the elastic element is disposed between the construction element and the activation element. The spatial arrangement of the elastic element relates to a vertical plane of the arrangement. The vertical plane is defined by the longitudinal direction of the vehicle and a vertical direction that is perpendicular thereto, such as the Z direction, for example. On account of the arrangement of the elastic element the latter is thus protected in terms of being almost inaccessible to abuse.

According to one further design embodiment, the activation element is displaceable in the longitudinal direction of the vehicle by means of the sliding member. The activation element in the closed position of the cover is coupled to the sliding member and upon the coupling element having been guided in a controlled manner into the pocket is decoupled from the sliding member when the sliding member is displaced farther. The cover by means of the deployment rod is raised in a rear region and moved to a venting position, for example. Starting from the closed position of the cover, the activation element is entrained toward the rear in the longitudinal direction of the vehicle when the sliding member is being displaced, wherein the coupling element of the activation element is subsequently introduced into the pocket. The activation element is subsequently decoupled from the sliding member. The activation element upon decoupling is therefore locked in its position when the elastic element is in the first state and a movement of the mechanical coupling element out of the pocket is thus blocked.

According to one further design embodiment, the activation element, starting from the closed position of the cover, when the sliding member is being displaced, in a decoupling plane is capable of being decoupled from the sliding member, and in the second movement section relative to the guide rail is capable of being blocked by introducing the coupling element into the pocket, wherein the introduction of the coupling element for blocking is performed substantially in the normal direction of the decoupling plane. By decoupling, a coupling for the entrainment of the activation element by means of the sliding member toward the rear in the longitudinal direction of the vehicle is released. The decoupling plane is understood to be that plane in which the coupling between the sliding member and the activation element is released. The activation element is coupled to the sliding member by way of an engagement element such as the coupling element, a cam, a bolt, a friction element, or the like, for example. This means that the activation element is locked to the sliding member initially in the X direction. In the case of any continuing displacement, the engagement element is decoupled from the sliding member. The activation element herein is no longer locked to the sliding member in the X direction. Releasing herein is performed in the decoupling plane which is defined by the X direction and a direction that is perpendicular to the X direction, for example the Z direction. The engagement element is guided in a gate of the sliding member, for example, and for decoupling exits said gate in the decoupling plane.

For decoupling, the sliding member has a locking gate and the activation element has a further coupling element, for example. Alternatively, the activation element has the locking gate and the sliding member has the further coupling element. Blocking is controlled by an interaction between the locking gate and the further coupling element in such a manner that the coupling element of the activation element is introduced into the pocket in a form-fitting manner in the normal direction to the decoupling plane. The normal direction is the Y direction of the mathematical coordinate system that runs so as to be normal to the X-Z plane, for example. On account of the form-fitting introduction it is achieved that the deployment rod is blocked in the X and Z directions which run so as to be parallel with the decoupling plane. The activation element is thus locked in its position.

According to one further design embodiment, the activation element in the closed position of the cover by way of the coupling element is coupled to the sliding member. On account thereof it is possible that one and the same coupling element of the activation element is used for activating the activation element and for blocking the latter. On account thereof, overall installation space can be saved, and material costs and production costs can be saved.

According to one further design embodiment, the decoupling plane is defined by the longitudinal direction of the vehicle and a vertical direction that is perpendicular thereto. The decoupling plane runs so as to be parallel with that plane in which the elastic element is moved, for example.

According to one further design embodiment, the activation element is configured as a deployment rod. Raising or deploying, respectively, or lowering the cover is controlled by means of the deployment rod. The deployment rod is coupled to the cover in the rear region by way of a rear deployment lever. If the deployment rod is decoupled from the sliding member as has been described earlier, or when the cover has been raised so as to be deployed to the maximum, respectively, the deployment rod and also the rear deployment lever are locked in their respective positions by virtue of the coupling element that is introduced into the pocket. Guiding the coupling element out of the pocket herein is blocked by means of the elastic element. On account thereof, a reliable functionality and reliable kinematics of the arrangement are guaranteed.

According to one further design embodiment, the elastic element is configured as a spring element, in particular as a metal wire or spring wire, a coil spring or a torsion spring.

According to one further design embodiment, the coupling element is configured as a friction element, in particular as a rotary slide. The coupling element can furthermore also be configured as a cam, a slide, or the like.

Further design embodiments are described hereunder in the detailed description of an exemplary embodiment with the aid of the appended figures.

Elements or features of identical construction or function are provided with the same reference signs in all figures. Elements or features which have already been described with the aid of reference signs are not necessarily provided with reference signs in all the figures.

In the figures:

BRIEF DESCRIPTIONS OF THE DRAWINGS

DETAILED DESCRIPTION

Figure 1:
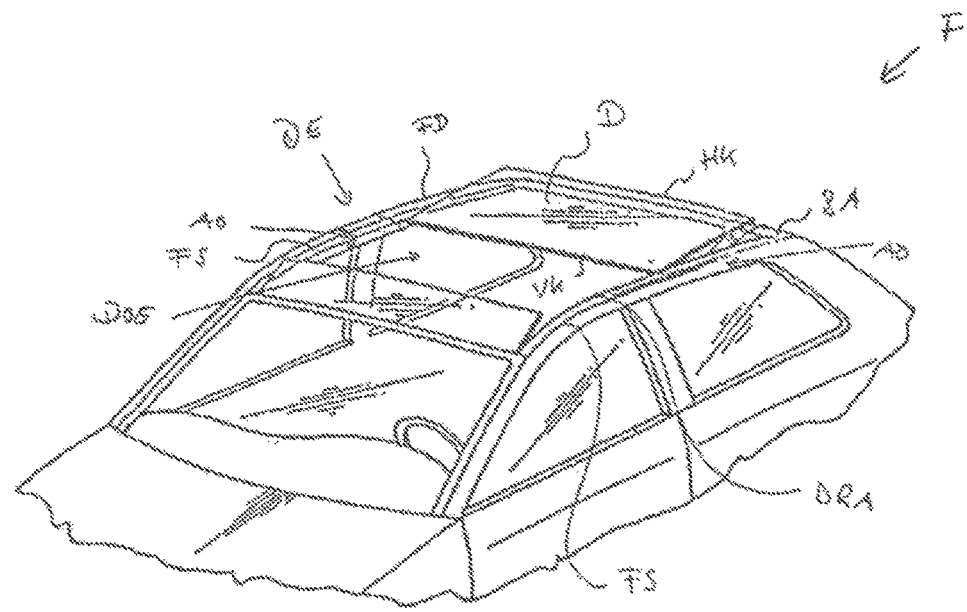
FIG. 1 shows a schematic perspective view of a vehicle.

FIG. 1 shows a schematic perspective view of a vehicle F having a vehicle roof FD. The vehicle roof FD has a securing portion BA which is fixed to the vehicle and is configured as a roof shell. The securing portion BA, fixed to the vehicle, is provided with a roof opening DOE which by means of an adjustable, movable roof element DE is selectively closed or at least partially releasable. The roof opening DOE is delimited by a roof frame portion DRA which is configured on the vehicle roof FD.

Arrangements AO having deployment means which preferably comprise guide rails FS that in relation to the roof frame portion DRA are disposed on either side are provided in order for the roof opening DOE to be released or closed.

The roof element DE has a cover D and is mounted in the region of the securing portion BA so as to be displaceable in relation to the guide rails FS. The roof element DE herein by way of a cover carrier is mounted so as to be displaceable in the guide rails FS. The cover D is preferably configured as a glass cover.

The deployment means serve the purpose of displacing the cover D, which closes the roof opening DOE of the vehicle roof FD, from a closed position to an opened position, so as to release the roof opening DOE of the vehicle roof FD. In a typical motion sequence for opening or releasing the roof opening, respectively, a rear edge HK of the cover D is initially deployed. This intermediate position is also referred to as a venting position. In the further course of the opening movement, the cover D is displaced toward the rear in the longitudinal direction of the vehicle to the opened position.

This typical sequence of motion is established with the aid of the arrangements AO which will be described in more detail by means of the following FIGS. 2 to 11. Herein, only one arrangement AO or a part thereof on one side, together with the associated mechanism, is illustrated in each of FIGS. 2 to 11. However, all parts of the arrangement AO are disposed in a mirror image in relation to a central longitudinal plane of the vehicle F on both sides of the roof opening DOE. The arrangement AO may also be referred to as a deployment device. It should be noted that a cover carrier DT which is mechanically fixedly coupled to the cover D is partially illustrated in FIGS. 2 to 11. Displacing or moving the cover D is therefore synonymous with displacing or moving the cover carrier DT.

A coordinate system which indicates the directions X, Y and Z is furthermore illustrated in each of FIGS. 2 to 11. The coordinate system corresponds to the mathematical coordinate system. The X direction herein may also be referred to as the longitudinal direction of the vehicle, or as the horizontal direction. The Z direction may also be referred to as the vertical direction.

Figure 2:
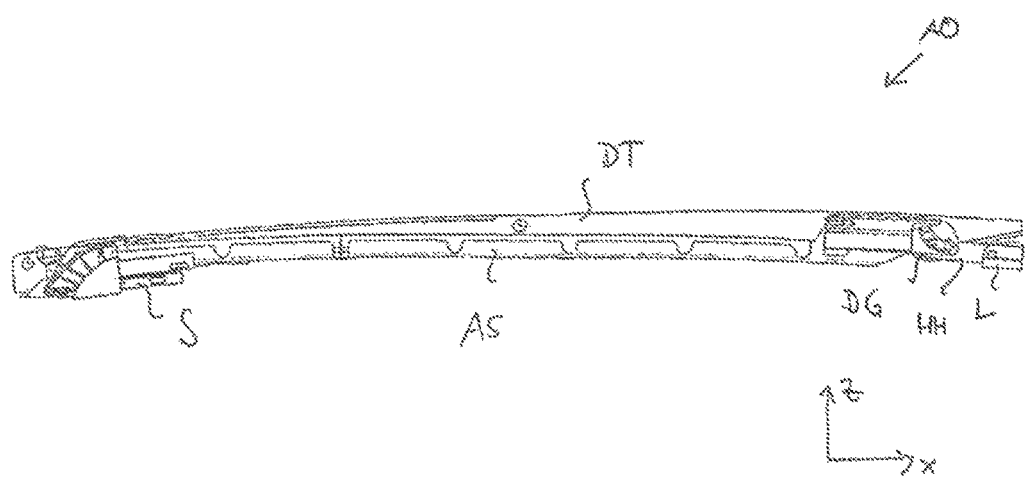
FIG. 2 shows a schematic side view of an arrangement having a cover carrier for a vehicle roof of the vehicle.

FIG. 2 shows a schematic side view of the arrangement AO. The closed position of the cover D is illustrated herein. The arrangement AO comprises a sliding member S which is displaceable in the longitudinal direction of the vehicle by means of a drive in a guide rail FS. Furthermore provided are a deployment rod AS, a locationally fixed bearing L, and a rear deployment lever HH. The rear deployment lever HH is pivotably connected to a cover slider DG which is displaceably coupled to the cover carrier DT. The deployment rod AS can also be referred to as the activation element.

If and when, starting from the closed position of the cover D, the sliding member S is displaced toward the rear, the deployment rod AS is likewise displaced toward the rear in parallel with the longitudinal direction of the vehicle, since the deployment rod AS is initially mechanically coupled to the sliding member S. Herein, the rear deployment lever HH is pivoted in relation to the bearing L such that the cover carrier DT, or the cover D, respectively, is deployed or raised, respectively, in the region of the rear edge HK. The cover D in this deployed state is in the venting position. If and when the sliding member S is displaced farther toward the rear, the sliding member S is decoupled from the deployment rod AS. This means that the deployment rod AS is no longer locked in the X direction to the sliding member S. Simultaneously, the deployment rod AS in the region of the front end thereof is secured by a locking mechanism so as to be locationally fixed in relation to the guide rail FS. This means that the rear deployment lever HH is likewise held so as to be locked in the deployed position. Upon further displacement of the sliding member S, the latter entrains the cover carrier DT and pushes the cover carrier DT and thus the cover D over the vehicle roof FD to the opened position. This is possible in that the rear deployment lever HH by way of the slider G is displaceably coupled to the cover carrier DT.

The arrangement AO in the forward region of the cover D will be discussed in detail hereunder by means of FIGS. 3 to 11. A reliable locking mechanism of the deployment rod AS following the decoupling of the latter from the sliding member S will be described in particular. The decoupling of the deployment rod AS from the sliding member S can be performed in various ways and will not be explained further hereunder. Reference is made in an exemplary manner to the locking gate mentioned at the outset and to the further coupling element. It is essential only that decoupling does take place.

Figure 3:
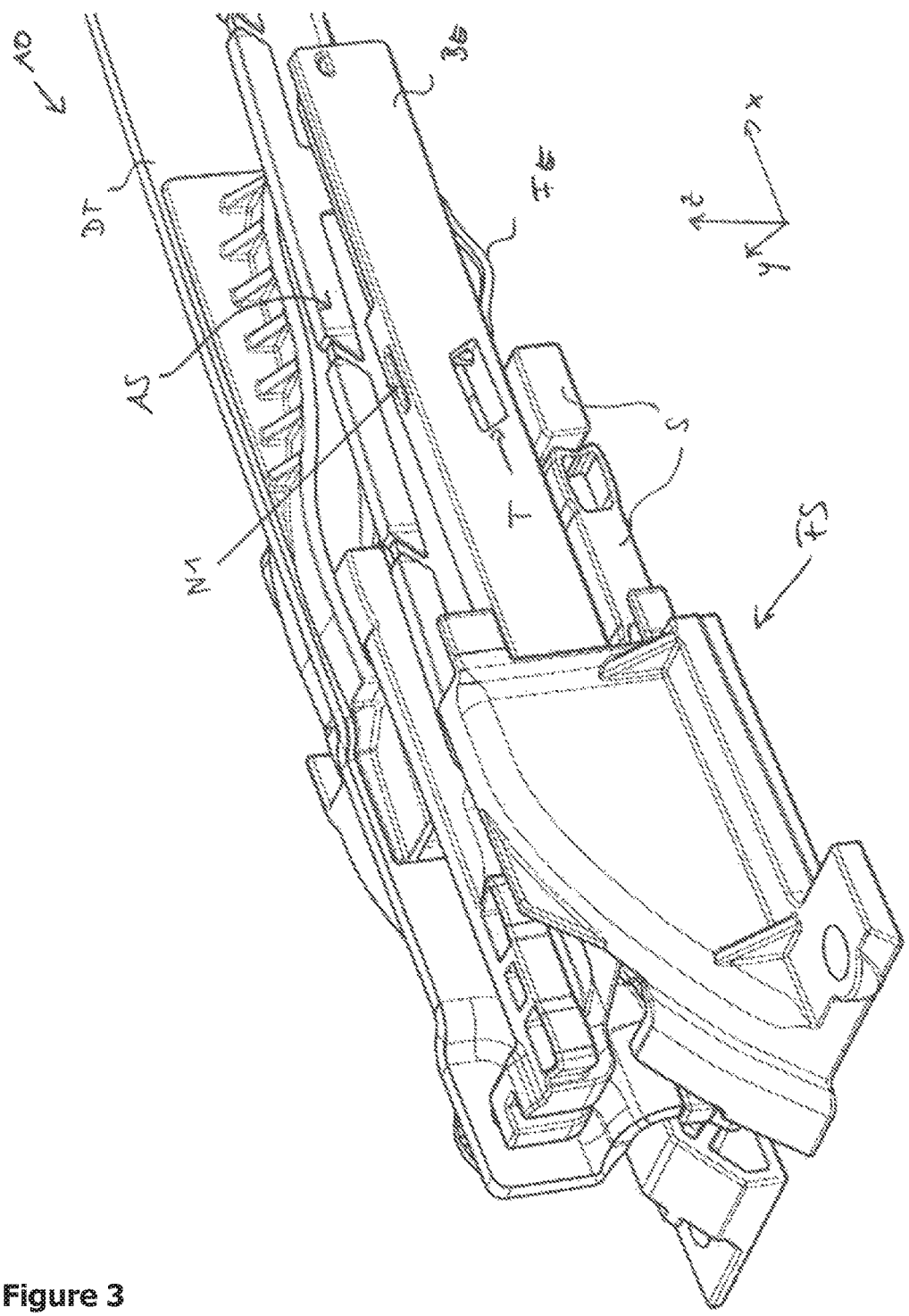
FIG. 3 shows a perspective partial view of the arrangement in a closed position.

FIG. 3 shows a perspective view of the arrangement AO in a forward region. The closed position of the cover D is shown herein. The arrangement AO has a construction element BE which in the exemplary embodiment is part of a guide rail FS. The construction element BE is thus disposed so as to be locationally fixed in relation to the guide rail FS. A pocket T is configured in the construction element BE. A spring element FE which is mounted so as to be locationally fixed on the construction element BE is furthermore provided. The spring element FE is a bent metal wire.

The spring element FE can be understood to be an elastic element as has been described at the outset.

Further details of the arrangement AO will be described by means of FIGS. 4A to 11. The motion sequence of the sliding member S, starting from the closed position of the cover D, will be explained herein. FIGS. 4A to 8B are divided into pairs of figures which are identified by the suffixes "A" and "B". One pair of figures, for example 4A and 4B, herein shows the arrangement AO in a specific state of the motion sequence. One sectional partial side view and one perspective sectional partial view of the arrangement AO are shown in each pair of figures.

Figure 4A:
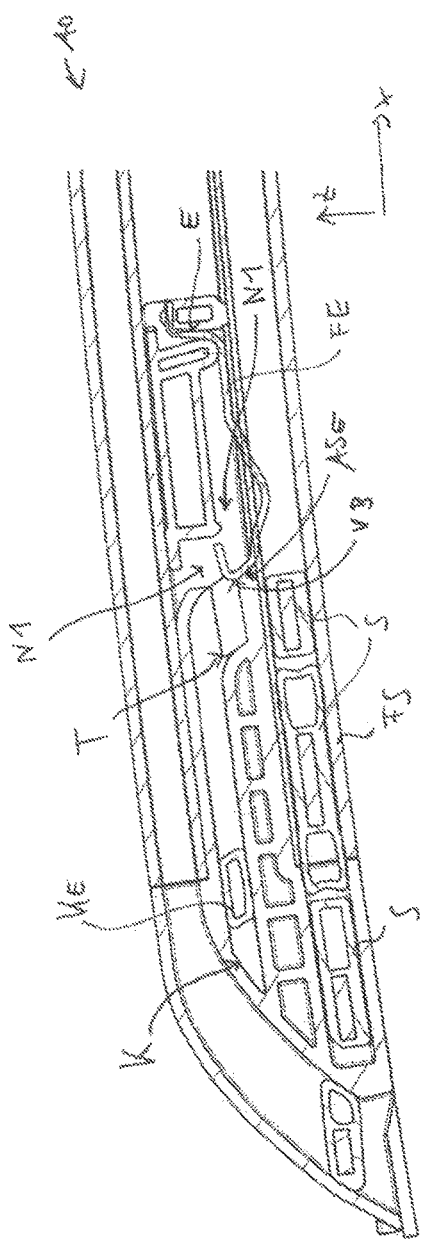
FIGS. 4A and 4B show a sectional partial side view and a perspective sectional partial view of the arrangement in the closed position.
Figure 4B:
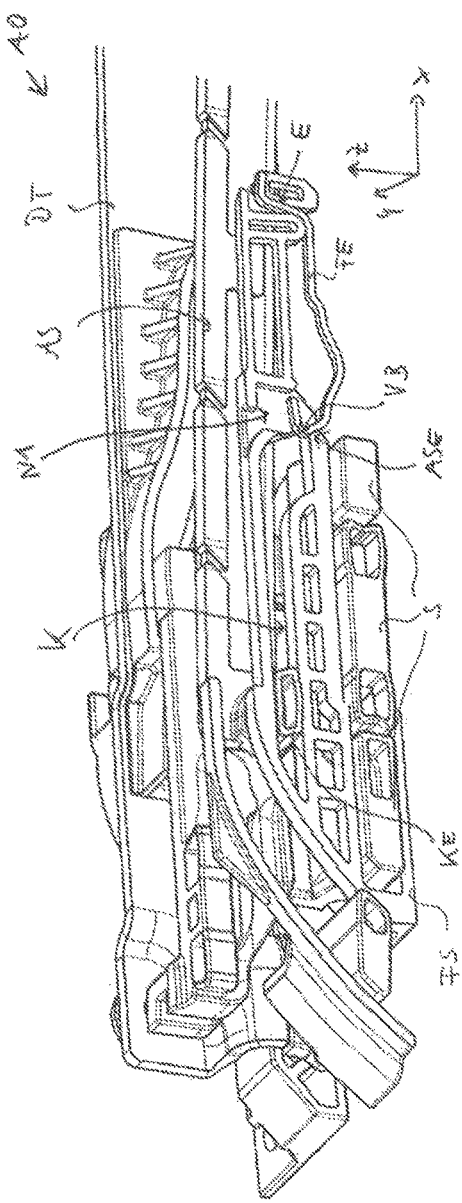

The arrangement AO is shown in the closed position of the cover D in FIGS. 4A and 4B. The deployment rod AS has a coupling element KE that is rigidly connected thereto. The coupling element KE is guided in a gate K which in relation to the guide rail FS is disposed in a locationally fixed manner. Furthermore, the deployment rod AS in the closed position of the cover D is coupled to the sliding member S (not illustrated). Furthermore to be seen is a contour of the pocket T, said contour in terms of the shaping thereof being adapted to the coupling element KE of the deployment rod AS. Furthermore illustrated is the spring element FE which by way of one end E is mounted so as to be locationally fixed on the construction element BE. The spring element FE extends in the longitudinal direction of the vehicle and is at least partially guided within a first groove N1 which is incorporated in the construction element BE. The first groove N1 is configured in the manner of a slot in the construction element BE. The first groove N1 extends at least partially into the pocket T such that the pocket T has an opening toward the first groove N1. In other words, the first groove N1 in part runs through the pocket T.

The spring element FE is in a first state in which a locking region VB of the spring element FE protrudes into the pocket T via the first groove N1. The locking region VB in the exemplary embodiment is a bent-back portion of the spring element FE. The spring element FE herein in the first state is under pre-tension, impacting on a detent element ASE. In other words, a spring force of the spring element acts downward in the negative Z direction. The spring element FE in the first state is thus held in a predetermined position. The detent element ASE is part of the construction element BE or of the guide rail FS, respectively.

Figure 5A:
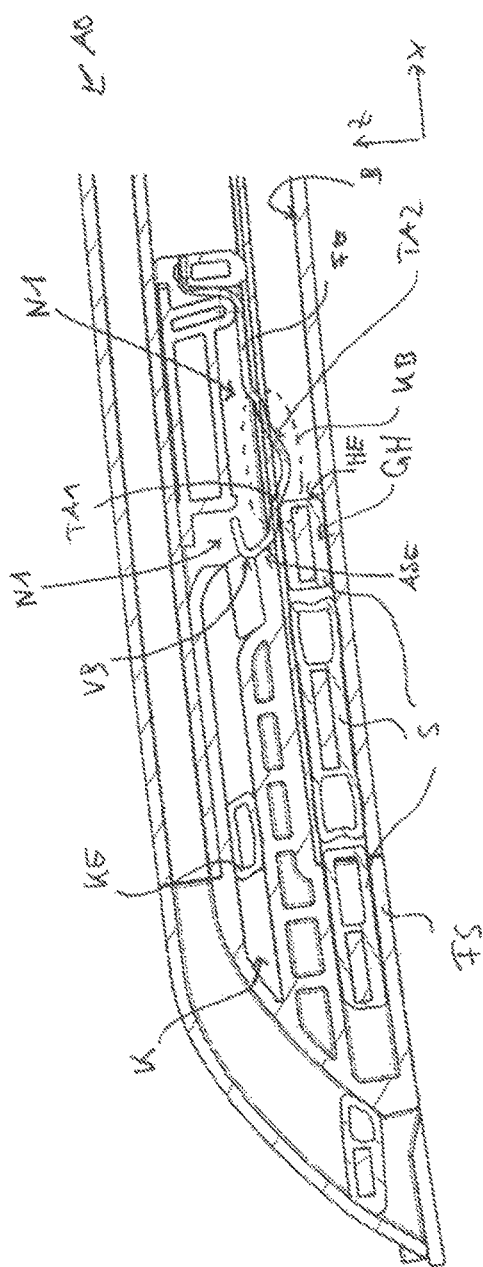
FIGS. 5A and 5b show a further sectional partial side view and a perspective sectional partial view of the arrangement in a first movement section of a sliding member.
Figure 5B:
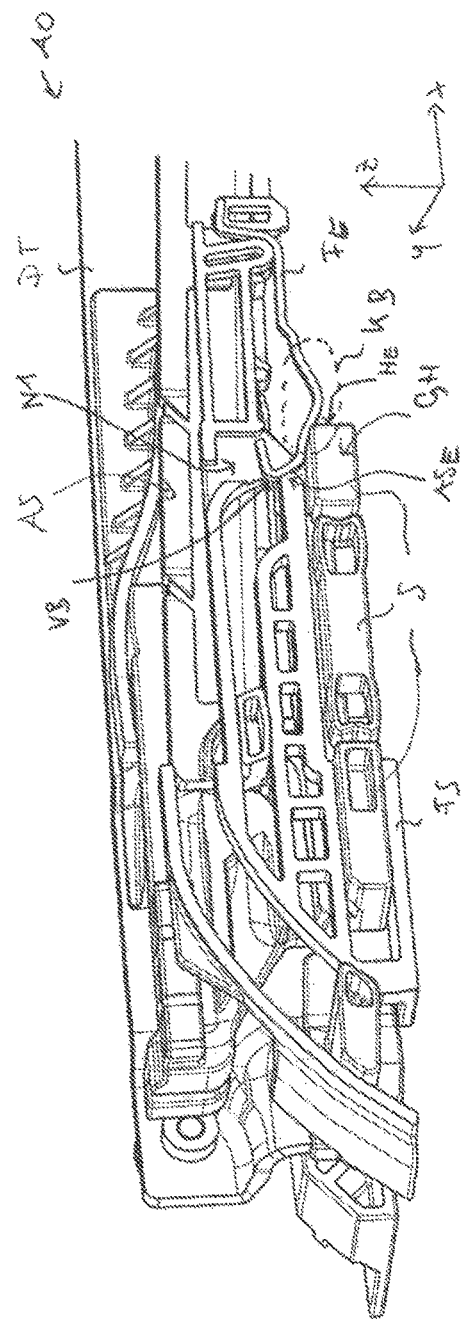

If the sliding member S in a first movement section is now displaced toward the rear in the longitudinal direction of the vehicle, said sliding member S entrains the deployment rod AS toward the rear, as has been described. Such a state of the arrangement AO is shown in FIGS. 5A and 5B.

The sliding member S activates the spring element FE in the first movement section. By virtue of the locationally fixed mounting of the spring element FE in relation to the guide rail FS, the sliding member S at least in part moves through below the spring element FE. The sliding member S herein by way of a rear end HE in a contact region KB of the spring element FE initially impacts on the spring element FE. The rear end HE is part of a rear slider GH of the sliding member S. The contact region KB is configured such that the former protrudes into a movement path of the sliding member S.

The contact region KB has a gate-type guide having a first part-portion TA1 and a second part-portion TA2. The part-portions TA1 and TA2 are configured in a ramp-like manner, wherein in the closed position of the cover D a spacing of an external side of the first part-portion TA1 that faces a base B of the guide rail FS from the base B decreases toward the rear in the longitudinal direction of the vehicle. The converse applies to the second part-portion TA2, in which the spacing of an external side of the spring element FE from the base B increases toward the rear in the longitudinal direction of the vehicle. In the closed position of the cover D, the contact region KB in a transitional region between the part-portions TA1 and TA2 has the smallest spacing from the base B.

Figure 6A:
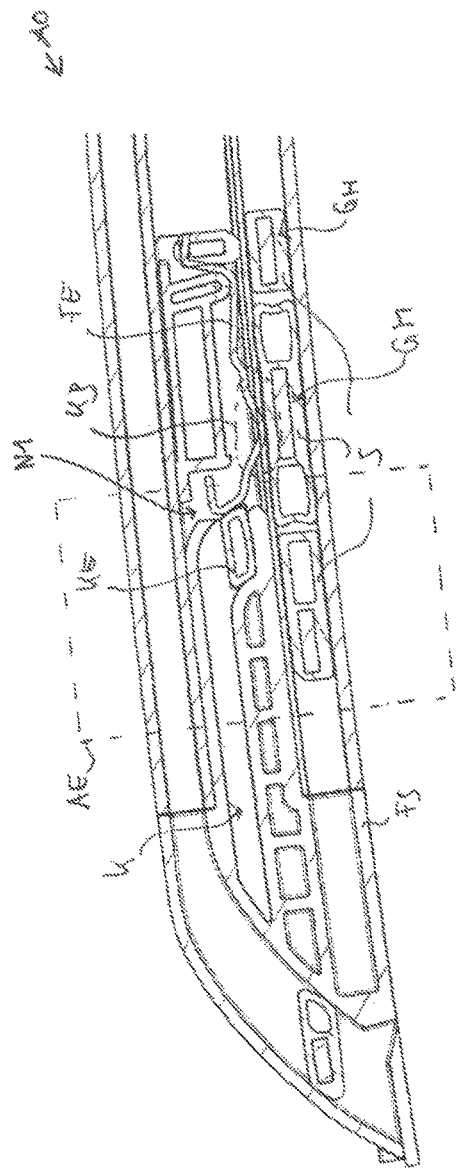
FIGS. 6A and 6B show a further sectional partial side view and a perspective sectional partial view of the arrangement in a second movement section of a sliding member.
Figure 6B:
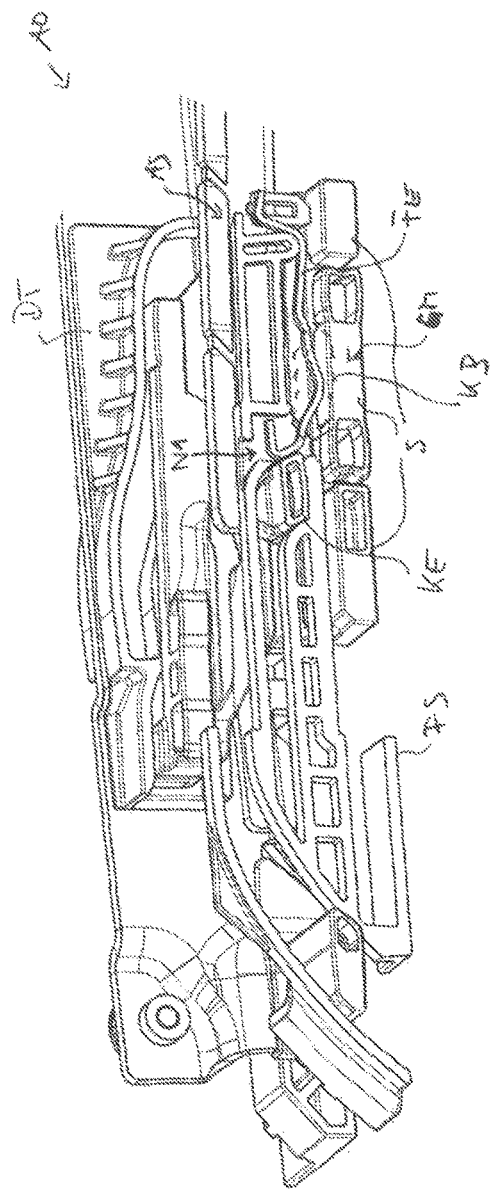

By virtue of the design embodiment of the first part-portion TA1 the spring element FE is raised in the Z direction, counter to a spring force, when the sliding member S is displaced in the X-Z plane. The spring element FE herein is transferred from the first state to a second state in which the locking region VB of the spring element FE no longer protrudes via the first groove N1 into the pocket T. The pocket T is thus completely released. The sliding member S herein contacts the contact region KB in the transitional region between the two part-portions TA1 and TA2. The second state of the spring element FE is shown in FIGS. 6A and 6B.

If the sliding member S is moved farther toward the rear in the longitudinal direction of the vehicle in a second movement section, the coupling element KE of the deployment rod AS is displaced in the gate K in such a manner that said coupling element KE is aligned with the pocket T. This is likewise shown in FIGS. 6A and 6B.

In a further displacement in the second movement section, the deployment rod AS is decoupled from the sliding member S in a decoupling plane AE. On account thereof, the deployment rod AS conjointly with the coupling element KE is no longer entrained toward the rear in the longitudinal direction of the vehicle. The decoupling plane AE is shown in dashed lines in FIG. 6A and runs in the X-Z direction.

Simultaneously, or in a subsequent displacement of the sliding member S, the deployment rod AS conjointly with the coupling element KE is repositioned in the Y direction, that is to say in a manner normal to the X-Z plane or to the decoupling plane AE, respectively. The coupling element KE herein plunges into the pocket T in a form-fitting manner. This is possible since the spring element FE is in the second state in which the pocket T is completely released.

It is to be pointed out at this stage that, depending on the position of the sliding member S in relation to the guide rail FS, contact points of the sliding member S, the latter contacting the contact region of the spring element FE in said contact points, can vary. As long as the spring element FE is in the second state, said spring element FE contacts the sliding member S in the transitional region between the first part-portion TA1 and the second part-portion TA2, wherein contact points of the sliding member S vary during the displacement. The spring force of the spring element FE at all times acts in the direction of the base B of the guide rail FS and pushes the spring element FE against the sliding member S. In the movement section shown in FIGS. 6A and 6B, the spring element FE is activated by way of a central slider GM for example and in the second state is held counter to the counteracting spring force.

Figure 7A:
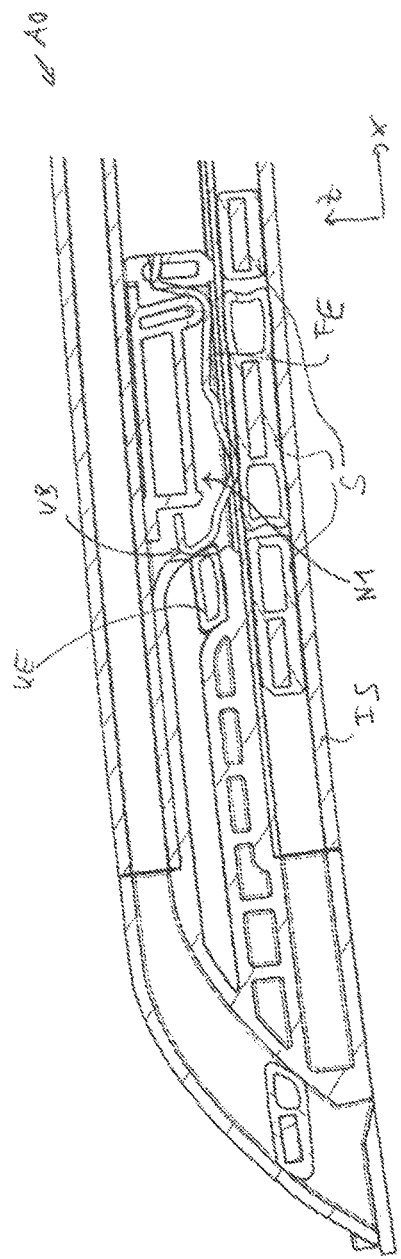
FIGS. 7A and 7B show a further sectional partial side view and a perspective sectional partial view of the arrangement in the second movement section of the sliding member.
Figure 7B:
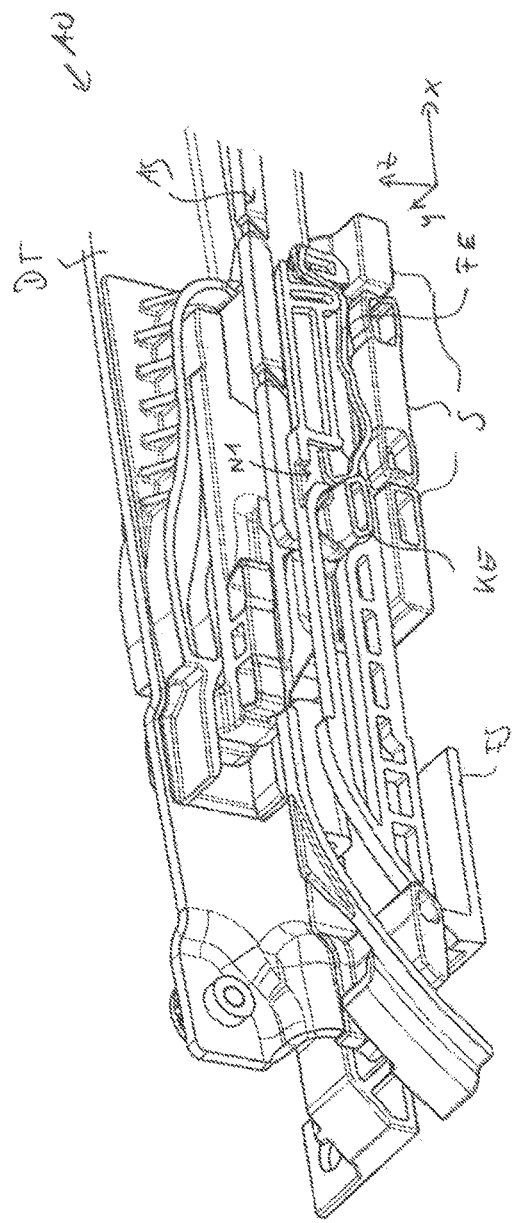

A movement of the deployment rods AS in the X-Z plane, thus in particular a movement in the longitudinal direction of the vehicle, is blocked as soon as the coupling element KE has been introduced into the pocket T. The deployment rod AS is thus locked in its position. The cover D herein at the rear edge HK thereof is deployed and is in the venting position. This is shown in FIGS. 7A and 7B, wherein it can be seen in particular in FIG. 7B that the coupling element KE has been displaced in the negative Y direction as compared to the state shown in FIGS. 6A and 6B.

Figure 8A:
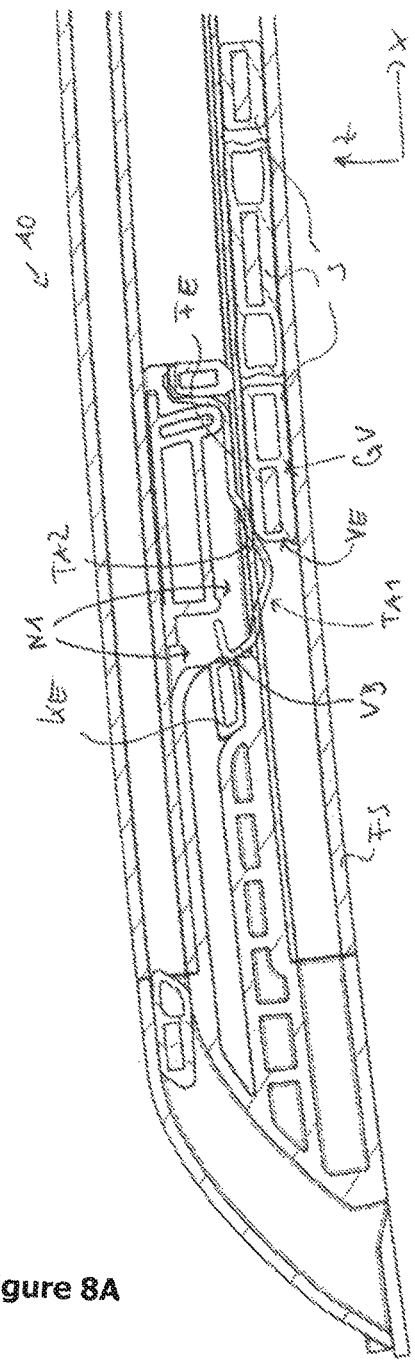
FIGS. 8A and 8B show a further sectional partial side view and a perspective sectional partial view of the arrangement in a third movement section of a sliding member.
Figure 8B:
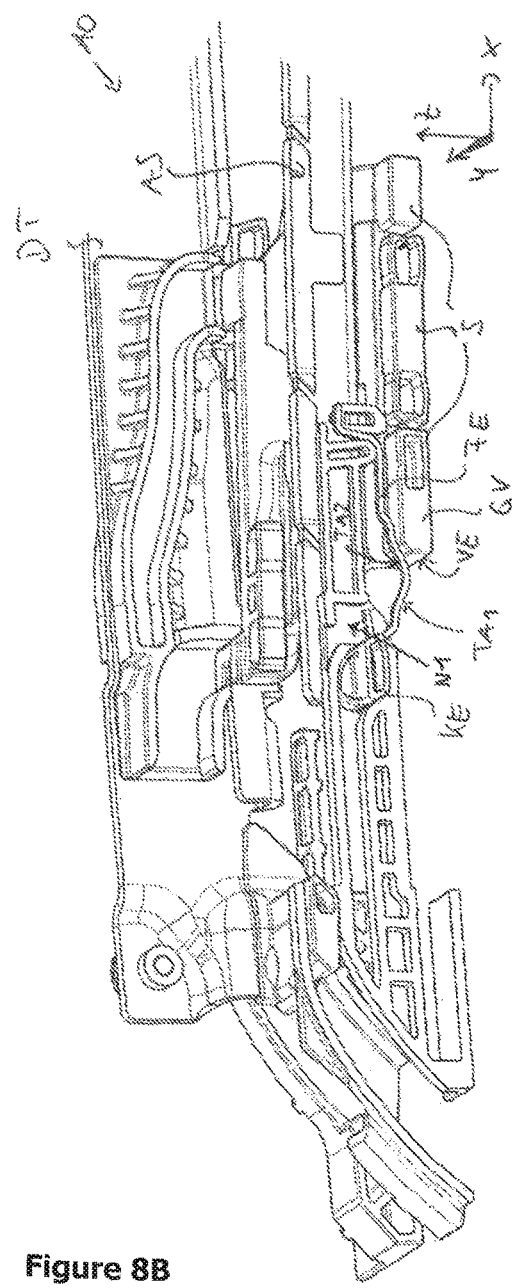
Figure 9:
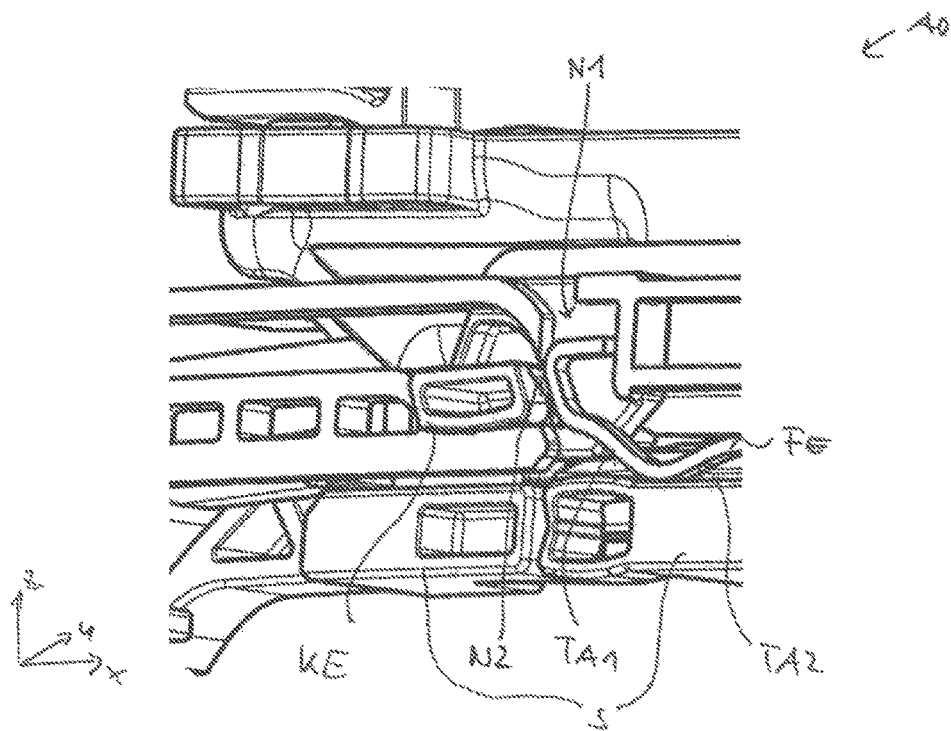
FIG. 9 shows a perspective view of the arrangement in the second movement section of the sliding member.
Figure 10:
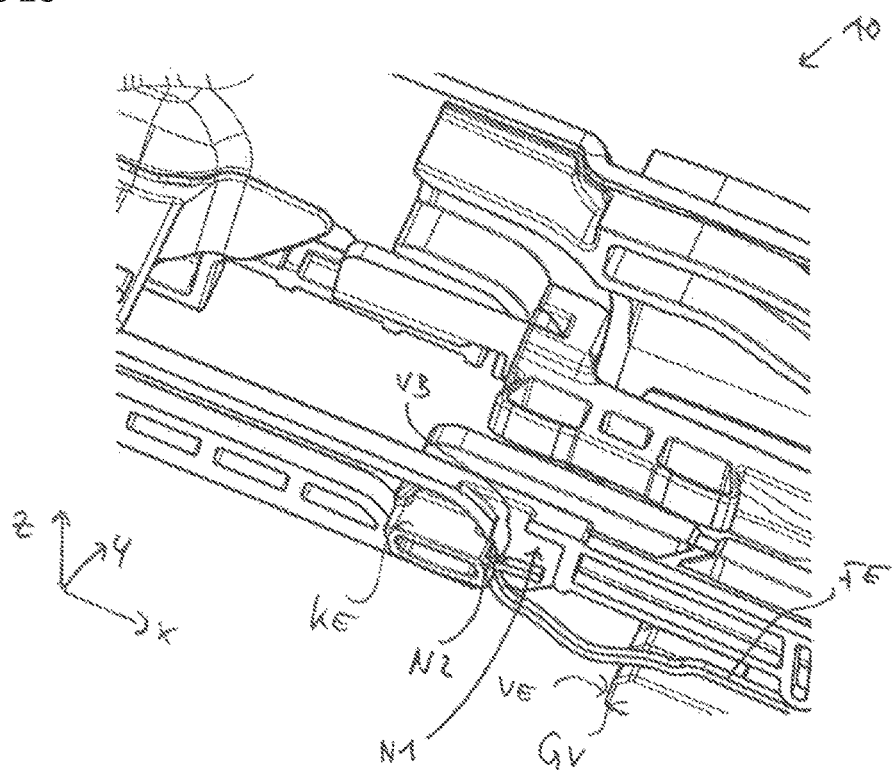
FIG. 10 shows a perspective view of the arrangement in the third movement section of the sliding member.

In order for the deployment rod AS to remain reliably and above all so as to be protected from abuse in its position, the deployment rod AS in a third movement section of the sliding member S is additionally blocked by way of the spring element FE. This is illustrated in FIGS. 8A and 8B.

If the sliding member S in the third movement section is displaced farther to the rear, the spring element FE is again transferred to the first state. A front end VE of the sliding member S which is part of a front slider GV of the sliding member S herein comes into contact with the second part-portion TA2 of the contact region KB. The spring force of the spring element FE herein has the effect that the spring element FE slides off smoothly by way of the rear end HE of the sliding member S and is lowered. The locking region VB of the spring element FE herein engages in a second groove N2 which is configured in the coupling element KE. This is illustrated in an enlarged manner in FIGS. 9 and 10.

If the coupling element KE is located completely in the pocket T, the second groove N2 is disposed so as to be substantially aligned with the first groove N1. Guiding out the coupling element KE from the pocket T is blocked on account of the engagement of the locking region VB in the second groove N2.

If the sliding member S is subsequently moved farther toward the rear, the locking region VB of the spring element FE remains in the second groove N2 of the coupling element KE. The spring element FE herein impacts on the detent element ASE and/or on the coupling element KE.

Figure 11:
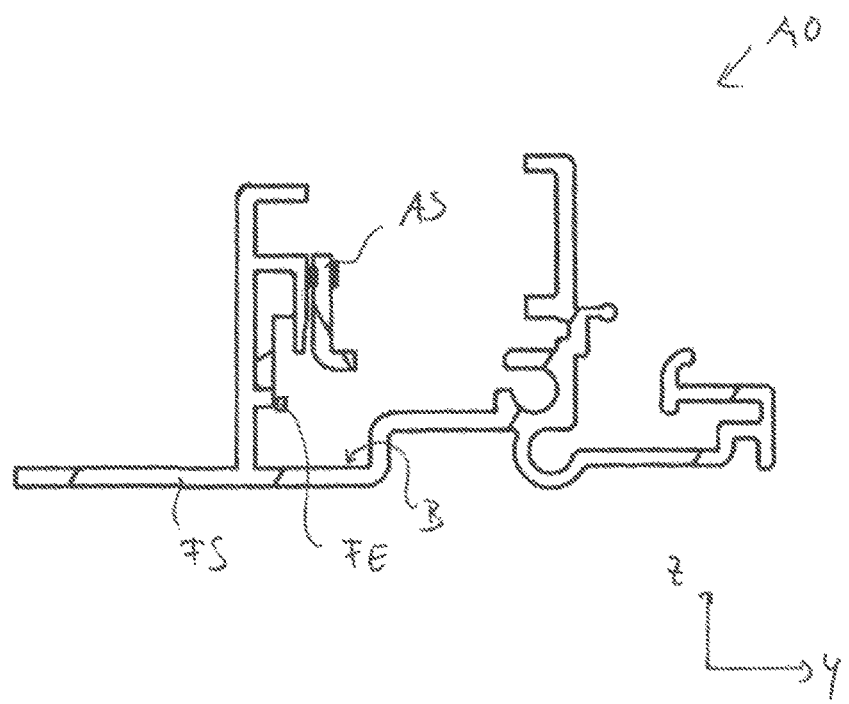
FIG. 11 shows a cross-sectional view of the arrangement.

The guide rail FS is illustrated in a cross section in the Y-Z plane in FIG. 11. It can be seen here that the spring element FE in relation to the Y direction is disposed between the guide rail FS, in particular an external wall, and the deployment rod AS. By virtue of the tight space conditions, any abuse of the spring element for releasing the blocking is almost precluded since the spring element FE practically cannot be reached by means of a pointed object or the like.

The motion sequence just described is correspondingly reversed when the sliding member S is displaced toward the front in the longitudinal direction of the vehicle, that is to say in the X direction, to the closed position of the cover D.

It is to be pointed out that the various described sliders GV, GM, and GH of the sliding member S can also be configured conjointly as one part, for example as one slider.

The blocking of the deployment rod AS by means of the spring element FE is described in the exemplary embodiment described. The deployment rod AS herein is to be understood as an activation element which activates the cover D in order for the latter to be deployed. However, the blocking by means of the spring element FE, as described above, is not limited to the deployment rod AS. Rather, the activation element can also be another element, for example a control arm, a lever, or the like, which is not provided for deploying the cover D. Such an activation element can likewise be blocked by means of the spring element FE, as has been described.

The invention claimed is:

1. An arrangement comprising a cover for a vehicle roof, said arrangement having a sliding member which is displaceable in a guide rail in the longitudinal direction of the vehicle by means of a drive; an activation element having a mechanical coupling element; a construction element that is locationally fixed in relation to the guide rail, a pocket which in the shaping thereof is adapted to the mechanical coupling element being formed in said construction element; and an elastic element that is mounted so as to be locationally fixed in relation to the guide rail; wherein in a first state the elastic element by way of a locking region protrudes into the pocket; in a second state the locking region is guided out of the pocket; such that, starting from a closed position of the cover, when the sliding member is being displaced in the longitudinal direction of the vehicle, in a first movement section of the sliding member the elastic element by means of the sliding member is transferable from the first state to the second state; in an adjacent second movement section of the sliding member an introduction of the mechanical coupling element into the pocket is controllable such that a displacement of the activation element is blocked at least in the longitudinal direction of the vehicle; and in an adjacent third movement section of the sliding member the elastic element is transferable from the second state to the first state, and a movement of the coupling element out of the pocket is blocked.

2. The arrangement according to claim 1, wherein the elastic element in the first state protrudes into the pocket by way of a first groove which is configured in the construction element.

3. The arrangement according to claim 2, wherein the elastic element is guided in the first groove.

4. The arrangement according to claim 1, wherein a second groove is configured in the coupling element, the elastic element in the first state at least partially engaging in said second groove so as to block the coupling element when the coupling element is located in the pocket.

5. The arrangement according to claim 4, wherein the second groove of the coupling element is at least partially configured so as to be funnel-shaped.

6. The arrangement according to claim 1, wherein one end of the elastic element is mounted so as to be locationally fixed, and the locking region of the elastic element is movable by means of the sliding member.

7. The arrangement according to claim 1, wherein the elastic element in the first state is pretensioned and impacts on a detent element.

8. The arrangement according to claim 1, wherein the elastic element has a contact region which when the sliding member is being displaced contacts the sliding member in order for the elastic element to be transferred from the first state to the second state and/or to be transferred from the second state to the first state.

9. The arrangement according to claim 8, wherein the contact region (KB) is configured as a gate-type guide.

10. The arrangement according to claim 8, wherein the contact region has a first part-portion in which a spacing of an external side of the elastic element that faces a base of the guide rail from the base decreases toward the rear in the longitudinal direction of the vehicle.

11. The arrangement according to claim 8, wherein the contact region has a second part-portion in which a spacing of an external side of the elastic element that faces a base of the guide rail from the base increases toward the rear in the longitudinal direction of the vehicle.

12. The arrangement according to claim 1, wherein the elastic element by means of the sliding member is movable in a plane which is defined by the longitudinal direction of the vehicle and a vertical direction that is perpendicular thereto.

13. The arrangement according to claim 1, wherein the elastic element is disposed between the construction element and the activation element.

14. The arrangement according to claim 1, wherein the activation element is configured as a deployment rod.

15. The arrangement according to claim 1, wherein the elastic element is configured as a spring element.

16. The arrangement according claim 1, wherein the coupling element is configured as a friction element.

\* \* \* \* \*